United States Patent
Lee et al.

(10) Patent No.: US 6,953,532 B2
(45) Date of Patent: Oct. 11, 2005

(54) METHOD OF POLISHING A LANTHANIDE SUBSTRATE

(75) Inventors: Jui-Kun Lee, Hoffman Estates, IL (US); Ronald E. Myers, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 188 days.

(21) Appl. No.: 10/382,370

(22) Filed: Mar. 6, 2003

(65) Prior Publication Data

US 2004/0175949 A1 Sep. 9, 2004

(51) Int. Cl.$^7$ .................................. C23F 1/00
(52) U.S. Cl. ..................... 216/89; 216/88; 252/79.1; 252/79.2
(58) Field of Search ............... 216/88, 89; 252/79.1, 252/79.2; 438/692

(56) References Cited

U.S. PATENT DOCUMENTS

| | | | |
|---|---|---|---|
| 4,086,001 A | * | 4/1978 | Chen et al. ................. 385/130 |
| 4,101,707 A | * | 7/1978 | Henry ......................... 428/409 |
| 5,356,833 A | | 10/1994 | Maniar et al. |
| 5,605,490 A | | 2/1997 | Laffey et al. |
| 6,381,830 B1 | | 5/2002 | Chikuba et al. |
| 6,408,840 B2 | | 6/2002 | Ishida |
| 6,465,272 B1 | * | 10/2002 | Davis et al. ................. 438/72 |
| 2002/0076932 A1 | * | 6/2002 | Dirksen et al. ............. 438/690 |

FOREIGN PATENT DOCUMENTS

| | | |
|---|---|---|
| EP | 1 254 862 A2 | 11/2002 |
| WO | WO 02/073729 A2 | 9/2002 |
| WO | WO 02/087002 A1 | 10/2002 |

* cited by examiner

*Primary Examiner*—Shamim Ahmed
(74) *Attorney, Agent, or Firm*—Caryn Borg-Breen

(57) ABSTRACT

The invention provides a method of polishing a substrate comprising a lanthanide-containing metal oxide material. The method comprises the steps of (i) providing a polishing system comprising (a) an abrasive, a polishing pad, or a combination thereof, (b) an acid, and (c) a liquid carrier, (ii) providing a substrate comprising a metal oxide layer, wherein the metal oxide layer comprises at least one lanthanide series element, and (iii) abrading at least a portion of the metal oxide layer with the polishing system to polish the substrate. The lanthanide-containing metal oxide material can be a lanthanide oxide, a doped lanthanide oxide, a lanthanide-doped metal oxide, a lanthanide perovskite, or any other suitable lanthanide-containing mixed metal oxide material, in particular those used as solid electrode and solid electrolyte materials in gas sensor and fuel cell devices.

37 Claims, No Drawings

METHOD OF POLISHING A LANTHANIDE SUBSTRATE

FIELD OF THE INVENTION

This invention pertains to a method of polishing a substrate comprising a lanthanide-containing metal oxide layer.

BACKGROUND OF THE INVENTION

Many new oxide materials have been developed for use as solid electrolytes and electrode materials in fuel cell and gas (e.g., oxygen) sensing technologies. In these devices, an anode and a cathode are positioned on either side of a solid electrolyte through which ions are conducted. Thus, the solid electrolyte must be ionically conducting and electronically insulating to prevent short-circuiting between the anode and cathode. Solid electrode materials must be both electronically conducting and ionically conducting. Ionic conductivity in oxide materials occurs when there is a defect such as an electronic vacancy in the crystal lattice of the material. The type of solid electrode and electrolyte materials depends on the type of electrochemical reaction taking place and the type of ion being conducted. Commonly, the device involves conductance of oxygen ($O^{2-}$) ions. Typically, solid electrode and electrolyte materials used as oxygen ion conductors are metal oxides which have been doped or stabilized.

For example, oxides of lanthanide oxide and lanthanide perovskite materials are currently being explored as electrode or electrolyte layers for solid oxide fuel cells (SOFCs). Suitable anode materials include doped metal oxides such as transition metal- or lanthanide metal-doped cerias (e.g., copper-doped ceria, gadolinium-doped ceria, strontium-doped ceria, and yttria-doped ceria), metal-stabilized zirconia "cermets" (e.g., Ni-yttria-stabilized zirconia, Cu-yttria-stabilized zirconia, cobalt-stabilized zirconia, ruthenium-stabilized zirconia, etc.), and the like. The cathode materials typically are perovskite materials, for example, lanthanum strontium manganate, lanthanum strontium ferrite, lanthanum strontium cobaltite, yttrium manganate, calcium manganate, yttrium ferrite, and mixtures thereof. The electrolyte layer typically comprises stabilized zirconias (e.g., yttria-stabilized zirconia, partially stabilized zirconia), doped cerias (e.g., samaria-doped ceria, $Ce_{0.8}Sm_{0.2}O_{1.9}$), stabilized bismuth sesquioxides, and the like. In some SOFC designs, the anode/electrolyte/cathode structure can further contain interfacial layers that act as buffers and/or interdiffusion barriers. Such materials can be mixed electronic/ionic conductors such as yttria-doped ceria or yttria-stabilized $Bi_2O_3$.

The manufacturing of gas sensor or SOFC devices presents several challenges. First, it is desirable that the solid electrolyte layer disposed between the anode and cathode layers be thin so as to reduce the operating temperature of the SOFC. In some cases, the SOFC material comprises multiple layers including a substrate layer, covered by a nitride layer, a thin film anode, a thin film electrolyte, and a thin film cathode. The fabrication of such layered materials is a major problem. In order to produce consistent thin films, it is necessary to provide a smooth and even surface onto which an electrode or electrolyte material can be deposited. WO 02/087002 A1 describes one method of manufacturing solid oxide fuel cells involving deposition of the anode and cathode materials into a well that has been etched into a dielectric or semiconductor substrate. In order to confine the cathode and anode materials to the area within the well and obtain ultra-thin electrolyte deposition layers, polishing has been suggested as a useful technique for removing excess cathode or anode materials and providing ultra-smooth surfaces.

Accordingly, there remains a need for a method of polishing substrates comprising lanthanide-containing metal oxide materials, such as those used in SOFCs and oxygen sensors, with high removal rate, low defectivity, and good selectivity. The invention provides such a polishing method. These and other advantages of the invention, as well as additional inventive features, will be apparent from the description of the invention provided herein.

BRIEF SUMMARY OF THE INVENTION

The invention provides a method of polishing a lanthanide-containing metal oxide substrate. The method comprises the steps of (i) providing a polishing system comprising (a) an abrasive, a polishing pad, or a combination thereof, (b) an acid, and (c) a liquid carrier, (ii) providing a substrate comprising a metal oxide layer, wherein the metal oxide layer comprises at least one lanthanide series element, and (iii) abrading at least a portion of the metal oxide layer with the polishing system to polish the substrate.

DETAILED DESCRIPTION OF THE INVENTION

The invention is directed to a method of polishing a substrate comprising a lanthanide-containing metal oxide material. The method of polishing involves providing a substrate comprising a lanthanide-containing metal oxide layer and contacting a portion of the substrate layer with a polishing system such that the polishing system abrades the substrate and polishes the substrate.

The metal oxide material can be a doped or undoped lanthanide metal oxide material, a non-lanthanide metal oxide that has been doped with a lanthanide metal, or any other suitable metal oxide comprising a lanthanide metal atom. The lanthanide metal can be any element selected from the lanthanide series including elements selected from the group consisting of yttrium, lanthanum, cerium, praseodymium, neodymium, promethium, samarium, europium, gadolinium, terbium, dysprosium, holmium, erbium, thulium, ytterbium, lutetium, and combinations thereof. Typically, the lanthanide metal is an element selected from the group consisting of cerium, neodymium, samarium, gadolinium, and combinations thereof. Desirably, the lanthanide-containing metal oxide layer comprises about 0.01 wt. % or more (e.g., about 0.1 wt. % or more, or about 1 wt. % or more) lanthanide series element based on the total weight of the lanthanide-containing metal oxide layer.

Lanthanide oxide materials include binary lanthanide oxides such as lanthanide sesquioxides of the general formula $Ln_2O_3$ wherein the lanthanide "Ln" can be Y, La, Nd, Sm, Eu, Gd, Dy, Ho, Er, Tm, Yb, or Lu, as well as the tetravalent lanthanide oxides such as $CeO_2$ (ceria), $Pr_6O_{11}$, and $Tb_4O_7$. Often, these lanthanide oxides are doped by the presence of another element. The dopant element can be any suitable element, including lanthanide elements, alkaline earth elements, main group metals, and transition metals. When the dopant is a lanthanide element, the dopant typically is selected from the group consisting of yttrium, lanthanum, cerium, praseodymium, neodymium, promethium, samarium, europium, gadolinium, terbium, dysprosium, holmium, erbium, thulium, ytterbium, lutetium, and combinations thereof. Typically, the lanthanide-containing metal oxide material is a lanthanide series metal-doped ceria, for example, samarium-doped ceria (SDC, e.g., $(Ce_{0.8}Sm_{0.2})O_{1.9}$), gadolinium-doped ceria (GDC, e.g., $(Ce_{1-x}Gd_x)O_2$), praseodymia/samaria-doped ceria (PSDC), or yttrium-doped ceria (YDC, $(Ce_{1-x}Y_x)O_{1.925}$). When the dopant is a non-lanthanide element such as an alkaline earth element, transition metal, or main group metal, the dopant desirably is selected from the group consisting of calcium, barium, strontium, scandium, zirconium, bismuth, cobalt, nickel, iron, copper, and combinations thereof. For example, the lanthanide-containing metal oxide can be calcium-doped ceria (CDC, $(Ce_{1-x}Ca_x)O_{1.88}$), bismuth-doped yttria (BYO, $(Bi_{1-x}Y_x)_2O_3$), strontium cerate ($Sr(Ce_{1-x}Yb_x)O_3$), barium cerate ($Ba(Ce_{1-x}Nd_x)O_3$), or the like. In some embodiments, the lanthanide metal oxide is doped by two or more (e.g., even 3 or more) lanthanide, alkaline earth, transition metal, and/or main group elements. The substrate layer can also be a metal oxide that has been doped by a lanthanide metal, for example, a yttrium-stabilized zirconia (YSZ, $(ZrO_2)_{1-x}(Y_2O_3)_x$), ytterbium-stabilized zirconia (YtZ), scandium-doped zirconia (ScZ, $(ZrO_2)_{1-x}(Sc_2O_3)_x$), as well as a variety of mixed metal oxide compounds including $La_{0.3}Sr_{0.2}Ga_{0.3}Mg_{0.2}O_3$, $Ln_2(TiZr)_2O_7$ (Ln=Sm, Gd, Y), $(LnCa)(AlGd)O_3$ (Ln=Pr, Nd), $BaCe_{0.3}Y_{0.2}O_3$, $SrCe_{0.95}Yb_{0.05}O_3$, $Ba(CeGd)O_3$, $Ba(CeDy)O_3$, and so called "cermet" materials which comprise transition metals such as Ni-yttrium-stabilized zirconia, Ni—MgO—YSZ, Ni—$TiO_2$—YSZ, Ni-ceria, Ni—$(CeO_2)_{0.3}(SmO_{1.5})$0.2, Ni—$PrO_2$, Ru—YSZ, $TiO_2$—YSZ, and the like.

Other suitable lanthanide-containing metal oxide materials include perovskites of the general formula $LnMO_3$, wherein Ln is any suitable trivalent lanthanide element described above and M is a smaller trivalent ion such as Sc, Ti, V, Cr, Mn, Fe, Co, or Ni. The properties of the perovskite are dependant on the identity of M and can include magnetism, electronic conductivity, and ionic conductivity. Many lanthanide perovskite materials are suitable for use as solid electrode materials in gas sensors and SOFCs, such as lanthanide chromites, lanthanide manganites, lanthanide cobaltites, and lanthanide ferrites. Suitable lanthanide chromites (M=Cr) include $LaCrO_3$, $CeCrO_3$, and $PrCrO_3$, as well as lanthanide chromites that have been doped by alkaline earth elements such as calcium or strontium or other transition metals such as cobalt or nickel (e.g., $(LaCa)CrO_3$, $(SmSr)CoO_3$,$(LaCa)(CrCo)O_3$, $(LaSr)(CrCo)O_3$, $(LaCa)(CrNi)O_3$, and $(LaSr)(CrNi)O_3$). The lanthanide chromites find use as anodic electrode or interconnector/separator materials. Suitable lanthanide manganites (M=Mn) include $(LnSr)MnO_3$, (Ln=La, Pr, Ce, Gd), $(LnCa)MnO_3$ (Ln=La, Pr, Ce, Gd), and $((LaY)Sr)MnO_3$. Suitable lanthanide cobaltites (M=Co) include $(LnSr)CoO_3$ (Ln=La, Gd) and $(LaSr))(CoFe)O_3$. Suitable lanthanide ferrites (M=Fe) include $(YFeO_3)$. Lanthanides also form perovskite compounds with titanium (M=Ti) and aluminum (M=Al). Suitable lanthanide titanates include $Ln_4Ti_9O_{24}$, $Ln_2Ti_2O_7$, $Ln_2TiO_5$, and barium lanthanide titanates ($BaO$—$TiO_2$—$Ln_2O_3$ (Ln=La, Nd, and Sm). Suitable lanthanide aluminate compounds include $LnAl_{11}O_{18}$, $Ln_3Al_5O_{12}$, and $Ln_4Al_2O_9$.

The substrates comprising the lanthanide-containing metal oxide materials can be any suitable substrates, including semiconductor wafers, solid oxide fuel cell electrodes or electrolytes, gas sensors, microelectromechanical system (MEMS) devices, photonic devices, optics (e.g., fine optics) and the like. Typically, the substrate is a solid oxide fuel cell electrolyte or electrode material.

The polishing system used in the method of polishing comprises (a) an abrasive, polishing pad, or combination thereof, (b) an acid, and (c) a liquid carrier. The abrasive can be in any suitable form (e.g., abrasive particles). The abrasive can be fixed on a polishing pad and/or can be in particulate form and suspended in the liquid carrier. The polishing pad can be any suitable polishing pad. The abrasive (when suspended in the liquid carrier) and acid, as well as any other components suspended in the liquid carrier, form the polishing composition of the polishing system. Preferably, the polishing system is a chemical-mechanical polishing (CMP) system.

The abrasive can be any suitable abrasive, but preferably is a metal oxide abrasive selected from the group consisting of ceria, alumina, zirconia, germania, titania, composites thereof, coated particles thereof, and combinations thereof. Other suitable abrasives include nanoparticulates of the lanthanide metal oxides, doped lanthanide metal oxides, lanthanide-doped metal oxides, and lanthanide perovskites as discussed in detail above with respect to the substrate composition. Preferably, the abrasive is selected from the group consisting of ceria, alumina, zirconia, composites thereof, ceria-coated silica, ceria-coated alumina, ceria-coated zirconia, lanthanide-doped forms thereof, rare earth pyrosilicates (e.g., $Ln_{2-x}Ce_xSi_2O_7$), and combinations thereof. More preferably, the abrasive is ceria, ceria-coated alumina, lanthanide-doped ceria, zirconia, or a combination thereof. The choice of abrasive may depend on the particular substrate being polished. For example, when the substrate comprises a ceria-based substrate layer, the abrasive desirably comprises ceria. When the substrate comprises a zirconia-based substrate layer, the abrasive desirably comprises ceria and/or zirconia.

The amount of the abrasive present in the polishing composition can be any suitable amount, for example about 0.01 wt. % or more (e.g., about 0.1 wt. % or more, or about 1 wt. % or more) based on the weight of the liquid carrier and any components dissolved or suspended therein. Desirably, the amount of the abrasive is about 20 wt. % or less (e.g., about 10 wt. % or less, or about 5 wt. % or less) based on the weight of the liquid carrier and any components dissolved or suspended therein. When the abrasive is ceria, preferably the amount of abrasive is about 0.01 wt. % or more (e.g., about 1 wt. % or more) but about 10 wt. % or less (e.g., about 8 wt. % or less, about 5 wt. % or less, or about 2 wt. % or less). The abrasive preferably has an average particle size of about 10 nm to about 800 nm (e.g., about 20 nm to about 500 nm), more preferably about 50 nm to about 200 nm (e.g., about 80 nm to about 150 $\mu$m).

The acid can be an inorganic acid, an organic acid, or a combination thereof. The inorganic acid can be, for example, nitric acid, hydrochloric acid, sulfuric acid, perchloric acid, phosphoric acid, salts thereof, or combinations thereof. The organic acid can be a simple mono-acid, di-acid, or polyacid (e.g., monocarboxylic acid, dicarboxylic acid, or polycarboxylic acid). Suitable organic acids include tartaric acid, oxalic acid, acetic acid, malonic acid, lactic acid, propionic acid, pththalic acid, glycolic acid, benzoic acid, citric acid, succinic acid, salicylic acid, hydroxybutyric acid, methyl lactic acid, polyacrylic acid, salts thereof, and combinations thereof. Preferably, the acid is an inorganic acid, more preferably hydrochloric acid or nitric acid. The amount of acid present in the polishing composition preferably is sufficient to produce a pH of about 7 or less, preferably about 2 to about 6. More preferably, the polishing composition has a pH of about 3 to about 5.5.

The polishing composition optionally further comprises a pH adjustor, a pH buffering agent, or a combination thereof. The pH adjustor can be any suitable pH-adjusting compound. For example, the pH adjustor can be potassium hydroxide, sodium hydroxide, ammonium hydroxide, or a combination thereof. The pH buffering agent can be any suitable buffering agent, for example, phosphates, acetates, borates, ammonium salts, and the like.

The polishing composition optionally further comprises a soluble cerium compound. The soluble cerium compound can be any suitable compound, for example, a cerium (III) salt, cerium(IV) salt, or combinations thereof. Preferably, the soluble cerium compound is selected from the group consisting of ceric hydrous oxides, cerium(IV) hydroxides, cerium(IV) compounds produced by reaction of cerium(III) salts with oxidizing agents such as peroxydisulfate and the like, cerium(III) nitrate, cerium sulfate, ceric ammonium nitrate, and the like.

The polishing system optionally further comprises a means of oxidizing one or more components of the substrate. The means for oxidizing the substrate can be any suitable means for oxidizing the substrate, which includes any physical and/or chemical means. Suitable physical means for oxidizing the substrate include a device for applying a time-varying potential (e.g., anodic potential) to the substrate (e.g., electronic potentiostat), which preferably is utilized in a polishing system involving electrochemical polishing. Suitable chemical means for oxidizing the substrate include a chemical oxidizing agent, which preferably is utilized in a polishing system that does not involved electrochemical polishing.

The device for applying time-varying potential to the substrate can be any suitable such device. The means for oxidizing the substrate preferably comprises a device for applying a first potential (e.g., a more oxidizing potential) during an initial stage of the polishing and applying a second potential (e.g., a less oxidizing potential) at or during a later stage of polishing, or a device for changing the first potential to the second potential during an intermediate stage of polishing, e.g., continuously reducing the potential during the intermediate stage or rapidly reducing the potential from a first, higher oxidizing potential to a second, lower oxidizing potential after a predetermined interval at the first, higher oxidizing potential. For example, during the initial stage(s) of the polishing, a relatively high oxidizing potential is applied to the substrate to promote a relatively high rate of oxidation/dissolution/removal of the substrate. When polishing is at a later stage, e.g., when approaching an underlying barrier layer, the applied potential is reduced to a level producing a substantially lower or negligible rate of oxidation/dissolution/removal of the substrate, thereby eliminating or substantially reducing dishing, corrosion, and erosion. The time-varying electrochemical potential is preferably applied using a controllably variable DC power supply, e.g., an electronic potentiostat. U.S. Pat. No. 6,379, 223 further describes a means for oxidizing a substrate by applying a potential.

The chemical oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is hydrogen peroxide. The polishing composition typically comprises about 0.1 wt. % to about 15 wt. % (e.g., about 0.2 wt. % to about 10 wt. %, about 0.5 wt. % to about 8 wt. %, or about 1 wt. % to about 5 wt. %) oxidizing agent, based on the weight of the liquid carrier and any components dissolved or suspended therein.

The polishing composition optionally further comprises a surfactant, for example, an anionic surfactant, nonionic surfactant, or cationic surfactant. Preferably, the polishing composition comprises a nonionic surfactant. One example of a suitable nonionic surfactant is an ethylenediamine polyoxyethylene surfactant. The amount of nonionic surfactant typically is about 0.0001 wt. % to about 1 wt. % (preferably about 0.001 wt. % to about 0.1 wt. %, or about 0.005 wt. % to about 0.05 wt. %) based on the weight of the liquid carrier and any components dissolved or suspended therein.

The polishing system optionally further comprises an antifoaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing system typically is about 40 ppm to about 140 ppm, based on the liquid carrier and any components dissolved or suspended therein.

The polishing system optionally further comprises a biocide. The biocide can be any suitable biocide, for example an isothiazolinone biocide. The amount of biocide used in the polishing system typically is about 1 to about 50 ppm, preferably about 10 to about 20 ppm, based on the liquid carrier and any components dissolved or suspended therein.

A liquid carrier is used to facilitate the application of the abrasive (when suspended in the liquid carrier), acid, and any optional additives or components suspended in the liquid carrier to the surface of a suitable substrate to be polished or planarized. The liquid carrier is typically an aqueous carrier and can be water alone, can comprise water and a suitable water-miscible solvent, or can be an emulsion. Suitable water-miscible solvents include alcohols such as methanol, ethanol, etc. Preferably, the liquid carrier consists essentially of, or consists of water, more preferably deionized water.

This example further illustrates the invention but, of course, should not be construed as in any way limiting its scope.

EXAMPLE

In particular, this example demonstrates that a polishing composition comprising an abrasive and an acid is effective in removing a samarium-doped ceria substrate layers.

Samarium-doped ceria (SDC) wafers were polished with different polishing compositions (Polishing Compositions A and B). Polishing Composition A (invention) contained 6 wt. % alumina and sufficient acid to produce a pH of about 4.5. Polishing Composition B (invention) contained 1 wt. % ceria and sufficient acid to produce a pH of about 5.2. The amount of SDC removed from a center region and an edge region of the wafers after 1 minute and 3 minutes was for determined for each of the polishing compositions. The results are shown in the table.

TABLE

| Polishing Composition | Amount Removed After 60 sec (in Å) From Center | Amount Removed After 60 sec (in Å) From Edge | Amount Removed After 180 sec (in Å) From Center | Amount Removed After 180 sec (in Å) From Edge |
| --- | --- | --- | --- | --- |
| A (invention) | 457 | 2283 | 2007 | 5184 |
| B (invention) | 1140 | 4046 | 3296 | 6307 |

The data set forth in the table show that polishing compositions of the invention are capable of polishing substrates comprising lanthanide-containing metal oxides with a high rate of removal.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of polishing a substrate, said method comprising the steps of:
   (i) providing a polishing system comprising:
      (a) an abrasive, a polishing pad, or a combination thereof,
      (b) an acid, and
      (c) a liquid carrier,
   (ii) providing a substrate comprising a metal oxide layer, wherein the metal oxide layer comprises at least one lanthanide series element and is selected from:
      (a) ceria further comprising a dopant,
      (b) a lanthanide oxide selected from $Y_2O_3$, $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, $Pr_6O_{11}$, or $Tb_4O_7$,
      (c) a metal oxide of the formula $LnMO_3$, wherein Ln is Y, La, Nd, Sm, Eu, Gd, Dy, Ho, Er, Tm, Yb, or Lu, and M is Sc, Ti, V, Cr, Mn, Fe, Co, Ni, or Al,
      (d) zirconia further comprising a lanthanide metal dopant, or
      (e) a metal oxide as in (b) or (c) further comprising a dopant, and
   (iii) abrading at least a portion of the metal oxide layer with the polishing system to polish the substrate.

2. The method of claim 1, wherein the metal oxide layer comprises ceria and the dopant is a lanthanide series dopant selected from the group consisting of yttrium, lanthanum, praseodymium, neodymium, promethium, samarium, europium, gadolinium, terbium, dysprosium, holmium, erbium, thulium, ytterbium, lutetium, and combinations thereof.

3. The method of claim 1, wherein the metal oxide layer comprises ceria and the dopant is a non-lanthanide series dopant selected from the group consisting of calcium, barium, strontium, scandium, zirconium, bismuth, cobalt, nickel, iron, copper, and combinations thereof.

4. The method of claim 1, wherein the metal oxide layer is a samarium-doped ceria, a gadolinium-doped ceria, or an yttrium-doped ceria.

5. The method of claim 1, wherein the polishing system comprises an abrasive, and the abrasive is present in an amount of about 10 wt. % or less based on the weight of the liquid carrier and any components dissolved or suspended therein.

6. The method of claim 1, wherein the polishing system comprises an abrasive, and the abrasive is a metal oxide abrasive.

7. The method of claim 6, wherein the metal oxide abrasive comprises ceria, alumina, zirconia, or combinations thereof.

8. The method of claim 7, wherein the metal oxide abrasive comprises ceria.

9. The method of claim 8, wherein the amount of the metal oxide abrasive is about 5 wt. % or less based on the weight of the liquid carrier and any components dissolved or suspended therein.

10. The method of claim 1, wherein the acid is an inorganic acid.

11. The method of claim 10, wherein the acid is an inorganic acid selected from the group consisting of nitric acid, phosphoric acid, sulfuric acid, salts thereof, and combinations thereof.

12. The method of claim 1, wherein the acid is an organic acid.

13. The method of claim 12, wherein the acid is an organic acid selected from the group consisting of oxalic acid, malonic acid, tartaric acid, acetic acid, lactic acid, propionic acid, phthalic acid, benzoic acid, salicylic acid, citric acid, succinic acid, salts thereof, and combinations thereof.

14. The method of claim 1, where the polishing system has a pH of about 2 to about 6.

15. The method of claim 14, where the polishing system has a pH of about 3 to about 5.5.

16. The method of claim 6, wherein the abrasive has an average particle size of about 10 nm to about 800 nm.

17. The method of claim 16, wherein the abrasive has an average particle size of about 50 nm about 200 nm.

18. The method of claim 1, wherein the polishing system further comprises a component selected from the group consisting of surfactants, chemical oxidizing agents, pH adjustors, pH buffers, antifoaming agents, biocides, and combinations thereof.

19. The method of claim 1, wherein the polishing system comprises an abrasive comprising ceria and an inorganic acid, and wherein the polishing system has a pH of about 2 to about 6.

20. The method of claim 1, wherein the metal oxide layer comprises $LaCrO_3$, $CeCrO_3$, $PrCrO_3$, $(LaCa)CrO_3$, $(SmSr)CoO_3$, $(LaCa)(CrCo)O_3$, $(LaSr)(CrCo)O_3$, $(LaCa)(CrNi)O_3$, $(LaSr)(CrNi)_3$, $(LaSr)MnO_3$, $(PrSr)MnO_3$, $(CeSr)MnO_3$, $(GdSr)MnO_3$, $(LaCa)MnO_3$, $(PrCa)MnO_3$, $(CeCa)MnO_3$, $(GdCa)MnO_3$, $((LaY)Sr)MnO_3$, $(LaSr)CoO_3$, $(GdSr)CoO_3$, $(LaSr)(CoFe)O_3$, $YFeO_3$, $La_4Ti_9O_{24}$, $La_2Ti_2O_7$, $La_2TiO_5$, $BaO-TiO_2-La_2O_3$, $Nd_4Ti_9O_{24}$, $Nd_2Ti_2O_7$, $Nd_2TiO_5$, $BaO-TiO_2-Nd_2O_3$, $Sm_4Ti_9O_{24}$, $Sm_2Ti_2O_7$, $Sm_2$, $TiO_5$, $BaO-TiO_2-Sm_2O_3$, $LnAl_{11}O_{18}$, $Ln_3Al_5O_{12}$, or $Ln_4Al_2O_9$.

21. The method of claim 1, wherein the metal oxide layer is yttrium-stabilized zirconia (YSZ), Ni—YSZ, Ni—MgO—YSZ, Ni—$TiO_2$—YSZ, Ru—YSZ, or $TiO_2$—YSZ.

22. The method of claim 6, wherein the metal oxide abrasive comprises a doped metal oxide abrasive.

23. The method of claim 22, wherein the doped metal oxide abrasive is present in an amount of about 10 wt. % or less based on the weight of the liquid carrier and any components dissolved or suspended therein.

24. The method of claim 24, wherein the doped metal oxide abrasive is a doped lanthanide metal oxide abrasive, a lanthanide metal-doped metal oxide abrasive, or a combination thereof.

25. The method of claim 22, wherein the doped metal oxide abrasive comprises ceria, alumina, zirconia, or combinations thereof.

26. The method of claim 25, wherein the doped metal oxide abrasive comprises ceria.

27. The method of claim 26, wherein the amount of the doped metal oxide abrasive is about 5 wt. % or less based on the weight of the liquid carrier and any components dissolved or suspended therein.

28. The method of claim 22, wherein the metal oxide layer comprises a lanthanide series element selected from the group consisting of yttrium, lanthanum, cerium, praseodymium, neodymium, promethium, samarium, europium, gadolinium, terbium, dysprosium, holmium, erbium thulium, ytterbium, lutetium, and combinations thereof.

29. The method of claim 29, wherein the metal oxide layer comprises about 0.01 wt. % or more lanthanide series element based on the total weight of the metal oxide layer.

30. The method of claim 29, wherein the dopant is a lanthanide series dopant selected from the group consisting of yttrium, lanthanum, cerium, praseodymium, neodymium, promethium, samarium, europium, gadolinium, terbium, dysprosium, holmium, erbium, thulium, ytterbium, lutetium, and combinations thereof.

31. The method of claim 29, wherein the dopant is a metal selected from the group consisting of calcium, barium, strontium, scandium, zirconium, bismuth, cobalt, nickel, iron, copper, and combinations thereof.

32. The method of claim 22, wherein the acid is an inorganic acid.

33. The method of claim 22, wherein the acid is an organic acid.

34. The method of claim 22, wherein the polishing system has a pH of about 2 to about 6.

35. The method of claim 22, wherein the abrasive has an average particle size of about 10 nm to about 800 nm.

36. The method of claim 35, wherein the abrasive has an average particle size of about 50 nm to about 200 nm.

37. The method of claim 22, wherein the polishing system further comprises a component selected from the group consisting of surfactants, chemical oxidizing agents, pH adjustors, pH buffers, antifoaming agents, biocides, and combinations thereof.

* * * * *